May 16, 1933.  J. ROBINSON  1,908,867
GASKET RENEWING MEANS FOR AUTOMATIC TRAIN PIPE CONNECTERS
Original Filed July 10, 1929
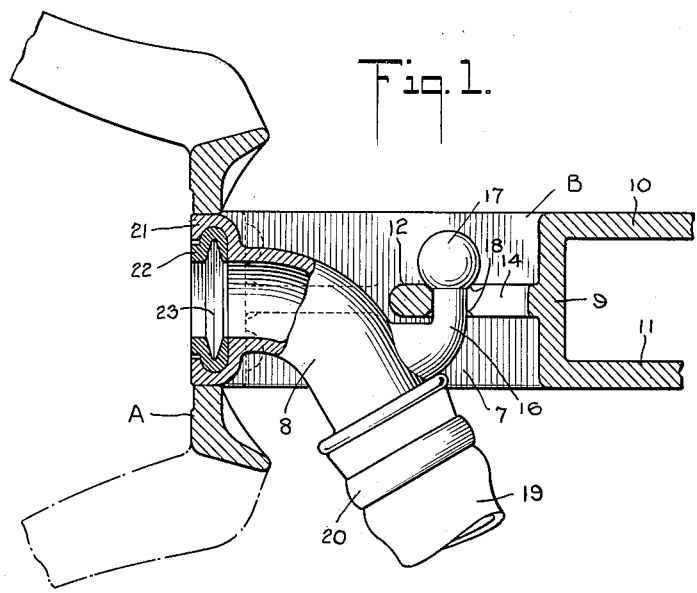
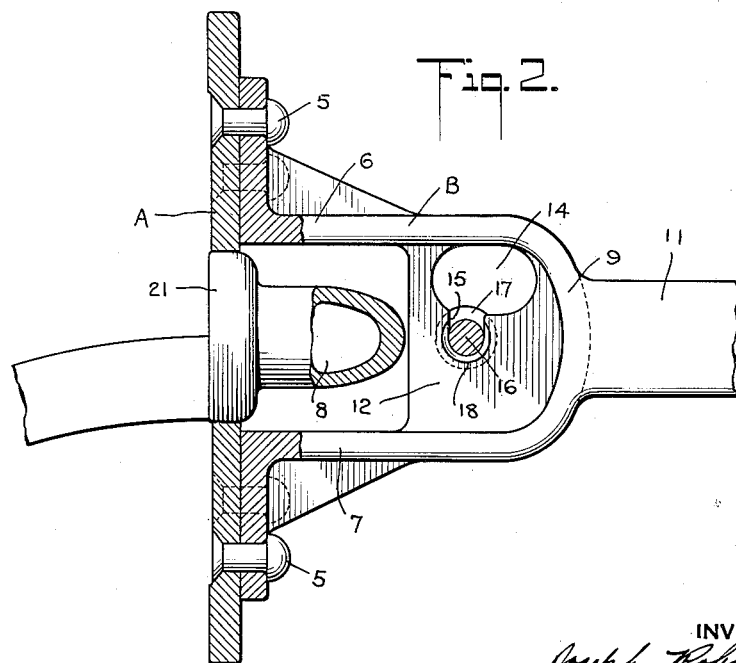
INVENTOR
Joseph Robinson
BY
Watson, Coit, Morse & Grindle
ATTORNEY Patented May 16, 1933

1,908,867

UNITED STATES PATENT OFFICE

JOSEPH ROBINSON, OF NEW YORK, N. Y.

GASKET RENEWING MEANS FOR AUTOMATIC TRAIN PIPE CONNECTERS

Application filed July 10, 1929, Serial No. 377,316. Renewed September 29, 1932.

My invention relates to improvements in automatic train pipe connecters, and particularly to means for removing defective gaskets from between the faces of coupled connecter heads. The construction is an improvement on the arrangement shown in my co-pending application serial #360,195 filed May 3rd, 1929.

In carrying out my invention I provide the coupling carrier or yoke B with a forked forward end which I rivet to the head A or form integral therewith. Within this fork I mount my gasket renewing device or conduit in a novel manner without movable locking parts and so that it may be readily inserted in the coupling head and carrier from either side of the latter.

In the drawing, Figure 1 is a sectional plan view of my improvement, and

Figure 2 is a side view thereof. In this figure a part of the conduit 8 is removed.

Any suitable coupling head A may be used with my improvement, and it may be mounted on the carrier or yoke B in any desired manner. In the present construction I rivet the head to the yoke as shown at 5. Spaced parts 6 and 7 form the front forward end of the yoke B, and between these the tubular laterally curved conduit 8 is removably mounted in the manner later described. The parts 6 and 7 lie one above the other in a horizontal plane and are joined at their rear ends by the wall 9. Rearwardly away from this wall extend the spaced straps 10 and 11, which are disposed in a vertical plane and are adapted to embrace or span the connecter bracket—not shown. The arrangement of these parts is well illustrated in my copending application aforesaid.

A web or anchor lug 12 is vertically disposed between the parts 6 and 7 preferably on the longitudinal center line of the connecter, and is formed integral with one or both of said parts. It is provided with a horizontally extending slot 14 and a vertically arranged groove or seat 15. On the rear side of the conduit 8 I provide an anchor lug or projection 16 which preferably extends transversely of the yoke B through the web 12 and normally rests in the seat 15. A ball or head 17 is provided on the lug to weigh it down and thus hold the conduit in locked relation to the web 12. On either side the seat 15 is chamfered as at 18 to receive the head 17 as shown. This arrangement provides, in combination with the tension of the hose 19, later to be described, an effective lock against undesired vertical movement of the lug 16 in its seat 15.

The usual flexible train pipe hose 19 is suitably connected to the conduit 8 as by a clamp 20. Whether the hose is made of rubber or metal its tendency is to hang vertically. Thus there is always the weight of the hose, if it be made of metal, and its weight and resiliency if it be made of rubber, tending to pull the conduit 8 laterally and downwardly and thus hold the lug 16 in its seat 15 and the head 17 of the lug 16 in the concave or chamfered seat 18. This locking effect is greatly augmented by the pressure of the fluid carried in the hose, for the reason that this pressure tends strongly to straighten out the hose and thus increase the pull on the conduit 8. Also the pressure fluid enters the expansible gasket later to be described and thereby increases the locking effect at the front. To remove the conduit it is pushed or shifted laterally in the fork of the yoke B, then tilted upwardly at its rear end to free the lug 16 of its interlocked engagement with the web 12, whereupon the conduit may be easily extracted from the coupling head A and the yoke. The reverse of this operation will remount the conduit in place.

As shown clearly in Figure 1, the conduit may be inserted in the head A and yoke B from either side thereof. This is because the lug or web 12 is positioned on the transverse center of the yoke B and on the longitudinal center line of the connecter. Particularly for cars in foreign service, the capacity of the fitting 8 to be mounted in either side of the yoke B is important, as on many foreign cars the train pipe hose is located on the opposite side of the car coupler to American standards.

It will be noted that the enlarged forward end 21 of the conduit 8 is mounted with a loose fit in an opening in the head A, and that its front face lies in approximately the plane of the coupling face of the head. In this enlarged end I mount an expansible gasket 22, grooved at 23 to admit thereto any pressure fluid carried. Thus when the air pressure is on, the gasket expands against the companion gasket and drives the conduit 8 rearwardly firmly pressing the lug 16 against its seat 15 in the web or lug 12.

What I claim is:

1. An automatic train pipe connecter comprising in combination, a coupling head having an opening, a carrier therefor, a lug extending away from a wall of said carrier and arranged rearwardly of said opening, a conduit removably mounted on said carrier with its front end positioned in the opening in said head, said conduit adjacent its rear end being provided with a projection extending transversely of said carrier into engagement with said lug, and cooperating means on said projection and said lug, to anchor the conduit in place.

2. An automatic train pipe connecter comprising in combination, a coupling head, a carrier therefor, a vertically extending anchor device rigidly mounted on said carrier rearwardly of said head and provided with an opening, and a conduit removably mounted on said head and said carrier, said conduit having a projection which extends across the longitudinal axis of said carrier and through the opening in said anchor device, and cooperating means on said projection and anchor device to lock the conduit in place.

3. An automatic train pipe connecter comprising in combination, a coupling head, a carrier therefor having a front end comprising spaced walls secured to said coupling head, a perforated lug extending vertically between said walls and rigid therewith, a conduit one end of which is mounted in said head in front of said lug and between said walls and the other end of which extends to one side of said lug, and a projection extending away from the rear side of said conduit transversely of said carrier through the perforation in said lug and cooperating means on said lug and projection to hold said parts together and thereby removably anchor the conduit in place.

4. An automatic train pipe connecter comprising in combination, a coupling head, a carrier therefor, a lug formed rigid with and extending away from a wall of said carrier, a conduit removably mounted on said carrier and said head, said conduit being provided with a projection extending transversely of said carrier into engagement with said lug to anchor the conduit in place, and means for protecting the projection and lug against accidental disconnection one from the other, said means including a hose connected to the rear end of said conduit and arranged to normally exert a force tending to hold said projection in engagement with said lug.

5. An automatic train pipe connecter comprising in combination, a coupling head, a carrier therefor, a lug formed rigid with and extending away from a wall of said carrier, a conduit removably mounted on said carrier and said head, said conduit being provided with a projection extending transversely of said carrier into engagement with said lug to anchor the conduit in place, and automatically actuating means tending constantly to hold the projection in firm interlocked engagement with said lug, said means including a hose connected to the rear end of said conduit and arranged to normally exert a force tending to hold said projection in engagement with said lug.

6. An automatic train pipe connecter comprising, in combination, a coupling head having an opening therein, a carrier for said head, a conduit mounted in said opening and extending rearwardly into said carrier, said conduit being insertable in and removable from said carrier from either side thereof, a projection on said conduit rearwardly of the front end thereof, a lug rigidly mounted on said carrier rearwardly of said opening in the head, and cooperating means on said projection and lug for locking said conduit in the carrier with the front end thereof lying within said opening.

7. An automatic train pipe connecter comprising, in combination, a coupling head having an opening, a carrier therefor, said carrier comprising upper and lower spaced portions, a conduit arranged between said portions with its front end lying in said opening, a lug rigidly connected to said spaced portions of the carrier and arranged rearwardly of said opening, a projection secured to said conduit adjacent the rear end thereof, and cooperating means on said projection and lug for locking said parts together and thereby removably holding said conduit in said carrier.

8. An automatic train pipe connecter comprising, in combination, a coupling head having an opening therein, a carrier therefor, said carrier comprising upper and lower portions with a space between the same, a lug projecting into said space rearwardly of said opening in the head, a conduit mounted in said space with its front end positioned in said opening, a projection on said conduit and cooperating means on said lug and projection for locking said conduit in said space.

9. An automatic train pipe connecter comprising, in combination, a coupling head, a carrier therefor, said carrier comprising upper and lower spaced portions, said head having an opening therein between the front ends of said spaced portions for receiving the front end of a conduit, and a lug rigidly mounted in said space rearwardly of said opening in the head and arranged to interlock with a conduit mounted in said space and said opening.

10. An automatic train pipe connecter comprising, in combination, a coupling head, a carrier therefor, said carrier comprising upper and lower spaced portions, a lug extending between the rear ends of said spaced portions and having an aperture therein, a conduit mounted in said space, said conduit having a projection extending into said aperture, and cooperating means on said lug and projection for locking said conduit in position in said space.

11. In a construction of the kind described, in combination, a carrier for an automatic train pipe coupling head, said carrier having a portion into which a conduit may be inserted, a conduit removably mounted in said portion, a lug extending away from one wall of said portion of the carrier and arranged rearwardly of said conduit, said conduit adjacent its rear end being provided with a projection extending transversely of said lug to anchor the conduit in place.

12. In a construction of the kind described, in combination, a carrier for an automatic train pipe coupling head, said carrier having a portion into which a conduit may be inserted, a conduit removably mounted in said portion, a vertically extending anchor device rigidly mounted on said carrier rearwardly of said conduit and having an opening therein, said conduit having a projection extending across the longitudinal axis of said carrier and through the opening in said anchor device, and cooperating means on said projection and anchor device to lock the conduit in place.

13. A carrier for an automatic train pipe coupling head, said carrier having a portion at its front end adapted to receive a conduit, said portion having a vertically arranged lug rearwardly therewith, said lug having an opening adapted to receive a projection on the conduit, and spaced straps extending rearwardly from said portion of the carrier.

In testimony whereof I hereunto affix my signature.

JOSEPH ROBINSON.